United States Patent

Fleckenstein et al.

[11] Patent Number: 5,810,535
[45] Date of Patent: Sep. 22, 1998

[54] MEANS FOR FASTENING AN AIRBAG MODULE

[75] Inventors: Jupp Fleckenstein, Bessenbach; Guido Hirzmann, Erpel, both of Germany

[73] Assignee: MST Automotive GmbH, Aschaffenburg, Germany

[21] Appl. No.: 742,077

[22] Filed: Oct. 31, 1996

[30] Foreign Application Priority Data

Nov. 4, 1995 [DE] Germany .................. 195 41 180.3

[51] Int. Cl.⁶ ........................... F16B 21/00; F16B 21/18
[52] U.S. Cl. ........................ 411/522; 411/552; 411/553
[58] Field of Search ................... 411/267, 270, 411/349, 433, 522, 552, 553, 512

[56] References Cited

U.S. PATENT DOCUMENTS

| | | |
|---|---|---|
| 2,200,702 | 5/1940 | Oddie . |
| 2,252,286 | 8/1941 | Hathorn . |
| 2,420,061 | 5/1947 | Adams . |
| 4,913,610 | 4/1990 | Olivieri ............................ 411/522 X |
| 4,929,135 | 5/1990 | DeLarue et al. .................. 411/267 X |
| 5,011,355 | 4/1991 | Motoshige ....................... 411/349 X |
| 5,333,897 | 8/1994 | Landis et al. . |
| 5,390,037 | 2/1995 | Worrell et al. . |
| 5,468,109 | 11/1995 | Farrari et al. ........................ 411/553 |

FOREIGN PATENT DOCUMENTS

| | | |
|---|---|---|
| 328759 | 12/1988 | European Pat. Off. . |
| 472995 | 12/1914 | France ............................... 411/522 |
| 2090860 | 1/1972 | France . |
| 2266815 | 10/1975 | France . |
| 3511070 | 10/1985 | Germany . |
| 595565 | 2/1978 | Switzerland ....................... 411/522 |
| 682003 | 6/1993 | Switzerland . |
| 851722 | 10/1960 | United Kingdom . |

OTHER PUBLICATIONS

Research Disclosure (1994) Dec., No. 368, Emsworth, GB "Self–locking Mechanism for DSIR and Steering Wheel Attachment".

*Primary Examiner*—Neill R. Wilson
*Attorney, Agent, or Firm*—Sprung Kramer Schaefer & Briscoe

[57] ABSTRACT

A mechanism is provided for the releasable, positive fastening of the back wall of the housing of an airbag module to a supporting component of a motor vehicle body, wherein at least two fastening points are formed. For each fastening point, on the housing back wall or on the supporting component, a pin is provided and on the other of the supporting component or the housing back wall, an opening is provided. A resiliently biased catch mechanism is disposed in the area of the opening. The pin has on its shaft a detent and has a cone-shaped or wedge-shaped front portion. The catch mechanism is biased transversely of its longitudinal axis from a closed position to an open position from which it springs back into a catching position when the pin has reached the given fastening position in the opening.

9 Claims, 1 Drawing Sheet

MEANS FOR FASTENING AN AIRBAG MODULE

BACKGROUND OF THE INVENTION

The invention relates to means for the releasable, positive fastening of the back of an airbag module to a supporting component of a motor vehicle body, wherein at least two fastening points are formed. To create a positive connection between an airbag module disposed in the front part, preferably on the steering wheel or in an appropriately shaped opening of the instrument panel, and a supporting structure accommodating this airbag module, screws are usually used by which the airbag module is fastened by its back to the supporting structure via the generator support. The manufacture of such a bolted fastening entails considerable difficulty in assembly.

To reduce this difficulty of assembly, in U.S. Pat. No. 5,333,897 an airbag module is provided with a number of pins applied to the back which are inserted through a corresponding opening in a supporting plate, and which have each a clip means which after insertion lies in a form-fitting manner on the back of the supporting plate. The clip means consists of a resilient material and is joined to an element producing a bias by which disengagement of the clip means from the supporting plate is prevented. The disadvantage of such fastening between the airbag module and the supporting plate is to be seen in the fact that the clip means consists of a plurality of individual parts which are mostly of a relatively complicated form and have to be manufactured to close manufacturing tolerances if they are to satisfy the requirements of series production. Some parts are furthermore liable to breakage, so that reliability of operation cannot be assured to a sufficient extent. Overall, the known method of fastening is seen as being too expensive.

There is therefore the problem of configuring the positive attachment necessary between an airbag module and a supporting structure such that on the one hand burdensome screw driving can be avoided, while on the other hand avoiding the need for the costly special manufacture of clip means. Connecting the airbag module and supporting structure is to be as simple as possible and quick to perform, and in case of need for separation it is to be just as simple and quick.

SUMMARY OF THE INVENTION

For the solution of this problem provision is made in accord with the invention, in the case of means of the kind referred to above, so that, for each point of fastening to the back of the housing (or to the supporting component) a pin is provided, and an opening to receive it is made on the supporting component (or on the back of the housing), that a resiliently biased catch means is disposed in the area of the opening, and that the pin has a tapered or wedge-shaped front portion and a detent on the shaft of the pin, while the catch means during assembly is biased by the front portion of the pin transversely of the long axis from a closed position to an open position from which it springs to a catch position when the pin has reached the given fastening position in the opening.

The invention is grounded in the knowledge that a clip connection between an airbag module and a supporting structure can be made very much simpler and at lower cost than in the proposal disclosed in U.S. Pat. No. 5,333,897 if catch means independent of the pin are provided. Thus the pin can be made as a simple rotationally symmetrical and consequently more inexpensively manufactured component. The catch means themselves are uncomplicated and can be made without excessively high requirements as to manufacturing accuracy.

In the embodiment of the idea of the invention it is expedient if the pin can be pushed into the opening further than the given fastening position, by compressing a resilient element acting lengthwise of the pin, and if the pin can be restored to the given fastening position, after the springing back of the catch means into the catch position by the resilient element, while sustaining a bias between the housing back wall and supporting component. It is furthermore expedient if the pin is joined to the housing wall (or to the supporting component) nonrotatably and projecting outwardly, and the catch means on the supporting component (or on the housing back wall) can be biased from the catching position to the open position by means of a tool, while the catch means escapes from the detent under the influence of the resilient element.

In one advantageous embodiment of the idea of the invention provision is made such that the pin is joined rotatably and projecting outwardly to the housing back wall (or the supporting component) and the detent on the pin is configured such that, by turning the pin with a tool about its long axis, the catch means can be biased to the open position, while the catch means escapes from the detent under the influence of the resilient element.

In another expedient embodiment provision is made such that the catch means consists of a pair of hooks opposite one another in a pincer-like manner, which have beveled engaging edges and are biased transversely of the pin's long axis to the closed position by springs, and can be biased by means of a tool to the open position, and that the pin has a front portion tapered to its end and broader step-wise than its shaft, and when the pin is inserted into the opening the hooks can be biased to the open position by the cooperation of the tapered front portion and the beveled engaging edges, and the abrupt diameter change between the front portion and the pin shaft forms the detent onto which the hooks catch when the pin has reached the given fastening position.

In another embodiment, provision is made such that the catch means consists of a spring rod biased to a closed position across the length of the pin and fixed at the end, which can be biased by means of a tool to an open position, and that the pin has a shaft with a conical point at its end and having a detent in the form of an undercut; the spring rod can be biased to the open position upon insertion into the opening and snaps back into the undercut when the pin has reached the given fastening position.

The catch means can consist of a U-shaped hairpin spring whose legs are biased across the long axis of the pin to a closed position and can be biased to an open position, the pin having a conically tapered front portion and an undercut area with a lens-shaped residual cross section, the legs of the hairpin spring being biased to the open position when the pin is inserted into the opening and snaps into the detent in the form of an undercut when the pin has reached the given fastening position, and the legs of the hairpin spring can be biased to the open position by rotating the pin 90° on its long axis, releasing the detent connection.

In an additional, expedient embodiment of the idea of the invention provision is made such that the catch means consists of a nonrotatably disposed spring plate having two catch arms set at an angle to the long axis of the pin, which are biased to an open position transversely of the long axis of the pin and can be biased to an open position, and that the shaft of the pin has a conically tapered front portion and two openings of wedge-shaped cross section lying opposite one another with a step-like detent, the catch arms being biased to the open position when the pin is inserted into the opening and snap into the step-shaped detents when the pin has reached the given fastening position, while the catch arms are biasable to the open position by turning the pin 90° on its long axis, releasing the catch.

The resilient element acting lengthwise of the pin can consist either of a spring acting between the housing wall and the supporting component, or of an elastomeric component disposed between the housing back wall and the supporting component.

Additional details of the idea of the invention will be further explained with the aid of embodiments represented in FIGS. 1 to 5, wherein:

DETAILED DESCRIPTION OF THE INVENTION

Figure 1:
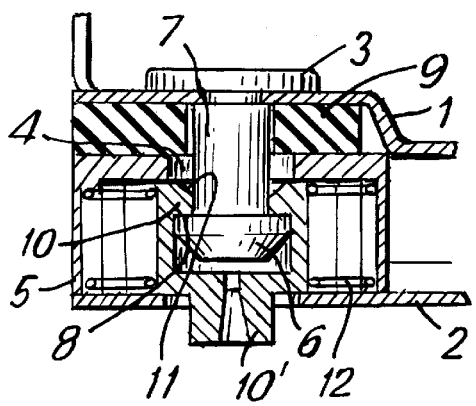
FIG. 1 is a first embodiment with a nonrotating pin

FIG. 1 shows a section through a fastening for an airbag module to a supporting component of a motor vehicle body. A pin 3 is joined to the back 1 of the airbag module in a nonrotatable manner, and has a shaft 7 and a front portion 6 that is widened step-wise and is tapered at the end 6. A component 5 in the form of a small, box-like case is bound to the supporting component 2 of the motor vehicle body, and in it there is mounted a pair of hooks 10 facing one another in a pincer-like manner, which have beveled edges 11 and are biased toward a closed position by springs 12 transversely of the longitudinal axis of the pin. The hooks 10 have prolongations 10' brought through an opening in the supporting component, between which a tool can be introduced in order to bias the hooks 10 to an open position when the airbag module is removed. During installation the pin 7 reaches with its tapered front portion through the opening 4 in the component 5, forces the edges 11 of the hooks 10 outward against the springs 12 until the end position represented is reached in which the hooks 10 catch on the front portion 6 which is broadened step-wise outwardly from the shaft 7 of the pin 3. An elastomeric component 9 disposed between the airbag housing wall 1 and the supporting component 2 and component 5 assures that the pin 3 can be advanced downwardly slightly further lengthwise than represented in order on the one hand to assure catching and on the other hand to maintain a bias in the lengthwise direction of the pin in the installed state. The resilient element 9 assures that the airbag module will not move relative to the car body, even due to vehicle vibration, and possibly create noise.

Figure 2:
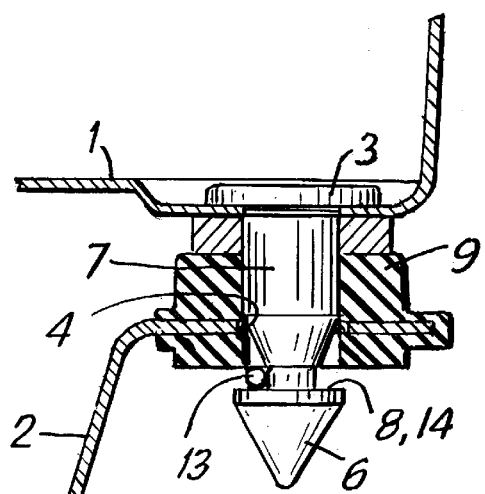
FIG. 2 is a second embodiment with a nonrotating pin

FIG. 2 also represents a section through a fastening means in which, again, a pin 3 is nonrotationally fastened to the back of the housing 1 of the airbag module. The supporting component 2 has an opening 4 and is surrounded at the insertion point by an element 9 of elastomeric material. The shaft 7 of the pin 3 has a beveled front end 6 and an engaging notch 8 in the form of a groove 14. A straight spring 13 is affixed to the supporting component 2 and cuts across the opening 4 in the manner of a secant, and when the pin 3 is inserted into the opening 4 it is biased to an open position by the chamfered front portion 6 and lastly snaps back into the groove 14 when the pin 3 has reached the predetermined fastening position. The element 9 of elastomeric material assures that the pin can be pushed in deeper than shown and that a resilient bias is maintained between the housing back 1 and the supporting component 2.

Figure 3:
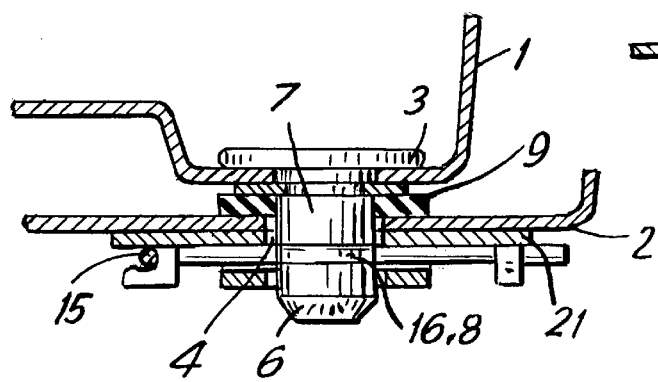
FIG. 3 and 4 represent a first embodiment with a rotatable pin

In the embodiment represented in FIG. 3 a pin 3 is provided which is fastened in the back of the housing of the airbag module for rotation on its longitudinal axis. A U-shaped hairpin spring 15 is fastened to the supporting component 2 over an intermediate piece 21 at points 22. The hairpin spring 15 straddles the opening 4 provided in the supporting component 2 and in the installed state it enters into a groove 16 in the shaft 7 of the pin 3 which is so configured that the pin 3 has in the groove area a lens-shaped residual cross section 17. When the pin 3 is turned on its longitudinal axis the legs of the hairpin spring 15 are stretched out of the closed position shown into an open position when the lens-shaped residual cross section 17 of the pin has reached a position turned 90°. In this position removal can be performed. An element 9 of resilient material again insures that the pin 3 can be pushed further into the opening 4 than shown, in order to assure that the hairpin spring will catch and to maintain a permanent bias between the housing wall 1 and the supporting component 2.

Figure 5:
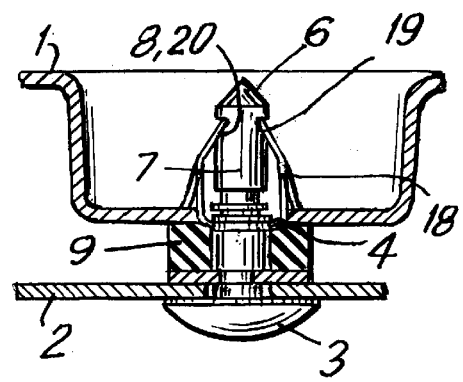
FIG. 5 is a second example with a rotatable pin.
Figure 4:
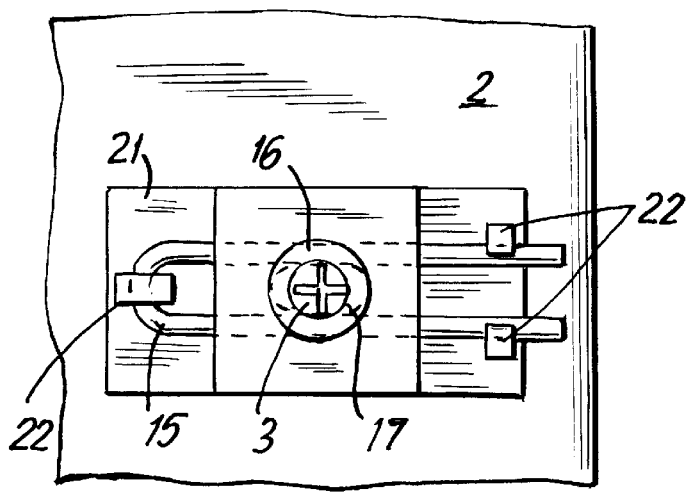

In the embodiment in FIG. 5 a spring plate 18 is disposed nonrotatably on the housing back and has two catches 19 situated opposite one another at a slanting attitude to the longitudinal axis of the pin 3. The pin 3 is in this case joined rotatable to the supporting component 2 and has a tapered front portion 6 and a groove portion consisting of two recesses 20 of wedge-shaped cross section situated opposite one another, forming a stepped snap catch 8. When the pin 3 is pressed into the opening 4 the catches 19 are forced outwardly by the tapered end of the pin until they finally snap into the wedge-shaped recesses 20. Since the latter are formed only on opposite sides of the pin 3, the catches 19 can be disengaged by rotating the pin 3 90° if the airbag module is to be removed. In this embodiment too an element 9 of elastomeric material is provided for the functions described above.

The idea of the invention is not limited to the embodiments represented, and instead it can also be embodied such that, in the embodiments according to FIGS. 1–3 the pin 3 is joined not to the back 1 of the housing but to the supporting component 2, as provided in the embodiment shown in FIG. 5. Of course, all the other components must be adapted accordingly. Even so, the embodiment in FIG. 5 can be constructed in the reverse manner.

We claim:

1. A mechanism for the releasable, positive fastening of a back wall of a housing of an airbag module to a supporting component of a motor vehicle body, wherein at least two fastening points are formed, wherein for each fastening point a pin is provided on one of the back wall of the housing and the supporting component and an opening to receive the pin is provided on the other of the supporting component and the back wall of the housing, wherein a resiliently biased catch means is disposed in the area of the opening, and wherein the pin has one of a wedge and cone-shaped front portion and a detent on the pin shaft, wherein the catch means is biased transversely of a longitudinal axis of the pin by the front portion of the pin when the latter is inserted, from a closed position to an open position, when the pin has reached the given fastening position in the opening, wherein the pin is inserted into the opening beyond the given fastening position by compression of a resilient element acting lengthwise of the pin, and after the catch means has been restored to the catching position by the resilient element, the pin is restored to the given fastening position while maintaining a bias between the back wall of the housing and the supporting component, and wherein the pin is joined nonrotationally and outwardly protruding to one of the housing wall and the supporting component and the catch means is stretched by a tool away from the catch position to the open position, while the catch means snaps out of the detent under the influence of the resilient element.

2. The mechanism according to claim 1, wherein the catch means comprises a pair of hooks opposite one another in the manner of pincers, which have beveled engaging edges and are biased transversely of the pin axis by springs to the closed position and are stretched with a tool to the open position, and wherein the front portion of the pin is broadened step-wise from its shaft and tapers conically at its end, while the hooks are stretched by the cooperation of the conically tapered front end with the beveled edges to the open position when the pin is inserted into the opening, and an abrupt diameter increase between the front portion and the pin shaft forms the detent into which the hoods snap when the pin has reached the given fastening position.

3. The mechanism according to claim 1, wherein the catch means comprises a nonrotatable spring rod biased transversely of the length of the pin to a closed position and fastened at an extremity and which is stretched by a tool to an open position, and wherein the pin has the shaft tapered conically at an end with the detent in the form of a groove, while the spring rod is stretched into the open position upon insertion into the opening and snaps into the groove when the pin has reached the given fastening position.

4. The mechanism according to claim 1, wherein the catch means comprises a nonrotatably disposed spring plate with two catches opposite one another and slanting toward the longitudinal axis of the pin and which are biased toward a closed position transversely of the longitudinal axis of the pin and are biased to an open position, and wherein the shaft of the pin has the front portion tapered and two recesses of wedge-shaped cross section opposite one another with the detent being step-shaped, while the catches, when the pin is pushed into the opening, are biased to the open position and catch in the step-shaped detents when the pin has reached the given fastening position, the catches are biased to the open position by rotating the pin 90° on its longitudinal axis, releasing the catch.

5. The mechanism according to claim 1, wherein the resilient element is a spring acting lengthwise of the pin between housing wall and supporting component.

6. The mechanism according to claim 5, wherein the resilient element is a spring acting lengthwise of the pin between the housing wall and the supporting component.

7. The mechanism according to claim 5, wherein the resilient element is an elastomeric component disposed between the housing wall and the supporting component.

8. The mechanism according to claim 1, wherein the resilient element is an elastomeric component disposed between housing wall and supporting component.

9. A mechanism for the releasable, positive fastening of a back wall of a housing of an airbag module to a supporting component of a motor vehicle body, wherein at least two fastening points are formed, wherein for each fastening point a pin is provided on one of the back wall of the housing and the supporting component and an opening to receive the pin is provided on the other of the supporting component and the back wall of the housing, wherein a resiliently biased catch means is disposed in the area of the opening, and wherein the pin has one of a wedge and cone-shaped front portion and a detent on the pin shaft, wherein the catch means is biased transversely of the longitudinal axis by the front portion of the pin when the latter is inserted, from a closed position to an open position, when the pin has reached the given fastening position in the opening, wherein the pin is inserted into the opening beyond the given fastening position by compression of a resilient element acting lengthwise of the pin, and after the catch means has been restored to the catching position by the resilient element, the pins is restored to the given fastening position while maintaining a bias between the back wall of the housing and the supporting component, and wherein the pin is joined rotatably and outwardly protruding with one of the housing back wall and the supporting component, and the detent on the pin is configured such that by rotating the pin with a tool about its longitudinal axis, the catch means is biased into the open position, while the catch means disengages the detent under the influence of the resilient element and wherein the catch means comprises a hairpin spring having legs biased transversely of the longitudinal axis of the pin toward a closed position and is stretched to an open position, and wherein the front portion of the pin is conically tapered and the pin has a groove area with a lens-shaped residual cross section, and when the pin is pushed into the open position and snap into the detent in the form of the groove area when the pin has reached the given fastening position, and the legs of the hairpin spring are biased to the open position by rotating the pin by 90° on its longitudinal axis, releasing the catch means.

* * * * *